Patented July 15, 1941

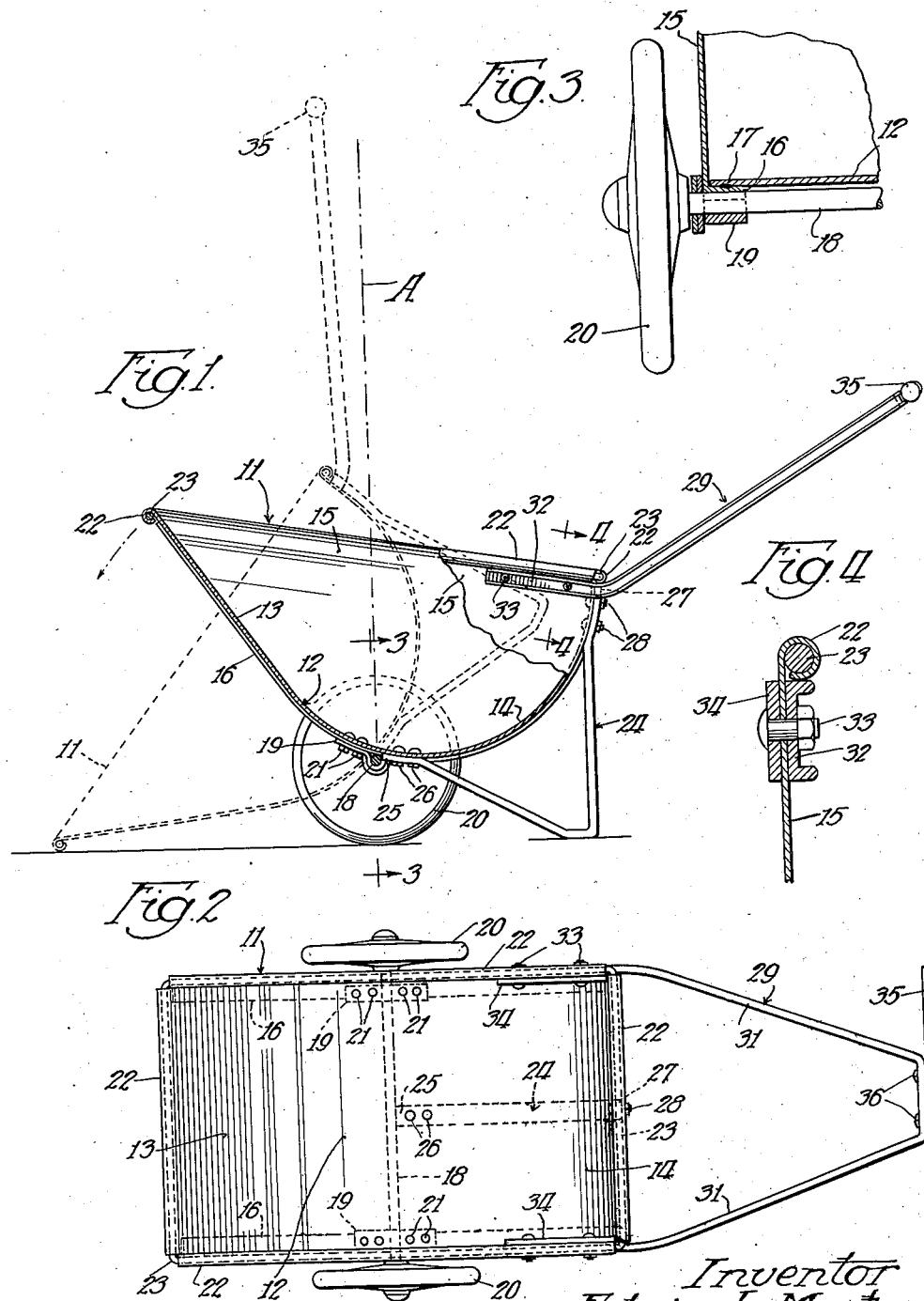

2,249,019

UNITED STATES PATENT OFFICE 2,249,019

HAND CART

Edwin L. Masters, Chicago, Ill.

Application February 14, 1940, Serial No. 318,848

2 Claims. (Cl. 280—51)

This invention relates to manually operated carts or vehicles, and particularly to a type of cart suitable for use around one's home, lawn, garden, and the like.

One object of the present invention is to provide a cart of strong, sturdy construction suitable for manually handling and transporting various materials such, for example, as top soil, ashes, leaves, sand, gravel and the like, from place to place as desired.

Another object of the invention is to provide a cart or vehicle having a receptacle associated therewith and so constructed that the front or leading edge portion of the receptacle may be suitably positioned with respect to and forced into a pile of material, such as sand, gravel, soil or the like, to facilitate loading of the material into the receptacle.

Another object of the invention is to provide a novel construction and arrangement whereby an edge portion of the receptacle may be positioned adjacent, or with respect to, the ground to facilitate the raking or pushing of leaves, or the like, into the receptacle.

Another object of the invention is to provide a novel construction and arrangement in a wheeled vehicle whereby the center of gravity of the receptacle and load carried thereby is positioned at the rear of the axle when the vehicle is in carrying position, and whereby the center of gravity of the vehicle is forward of the axle when in loading position.

Another object of the invention is to provide a wheeled cart of the character described, which may be readily tilted to conveniently discharge a load or portion thereof from the receptacle when and where desired.

Another object of the invention is to provide a novel construction and arrangement whereby the center of gravity of the receptacle, including the handle secured thereto, when in loading or discharging position, is positioned forwardly of a vertical plane extending through the center of the vehicle axle, thereby providing a structure, which, to a marked degree, facilitates the spreading or distribution of the material as it is discharged from the receptacle.

A further object of the invention is to provide a strong, durable device of simple construction, efficient in its operation and economical to manufacture.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a side elevational view, partly in section, of a wheeled hand cart or vehicle, embodying features of the present invention, and illustrating in dotted lines a loading or discharge position of the cart;

Fig. 2 is a plan view of the structure illustrated in Fig. 1;

Fig. 3 is an enlarged fragmentary transverse sectional elevational view of a portion of the structure illustrated in Fig. 1, and taken substantially as indicated by the line 3—3 thereof; and Fig. 4 is a transverse sectional elevational view of a portion of the structure illustrated in Fig. 1, and taken substantially as indicated by the line 4—4 thereof.

Referring to the drawing, the structure illustrated therein is provided with a receptacle indicated, as a whole, by the numeral 11 comprising a load supporting member indicated, as a whole, by the numeral 12 and having formed integrally therewith a substantially flat portion 13 inclined forwardly and upwardly to form the front end wall of the receptacle. Forming also a part of the supporting member 12 is a portion 14 curved upwardly and rearwardly in a manner to form the rear end wall of the receptacle.

Associated with the load supporting member 12 are side walls 15 having flanges 16 shown, in the present instance, as extending inwardly and beneath the supporting member 12 and secured thereto by welding, as indicated at 17 (Fig. 3), or by other suitable means in a manner to provide a rigid connection between the lower portions of the side walls 15 and the supporting member 12.

Positioned adjacent the lower portion of the receptacle and forwardly of the center of gravity thereof and of the load intended to be carried thereby is an axle 18 adapted to be secured to the flanges 16 and load supporting member 12 by means of straps 19 secured in place preferably by means of bolts 21, and shown, in the present instance, as adapted to secure the axle 18 rigidly to the lower side of the receptacle, the axle 18 being provided adjacent its respective opposite and outer end portions with wheels 20 rotatably mounted thereon for moving the cart or vehicle over the ground.

For stiffening the upper edge portion of the receptacle, the upper edges of the side walls 15 and front and rear end walls 13 and 14, respectively, are provided with outwardly extending hollow beads 22 having a continuous reinforcing or stiffening rod 23 mounted therein to provide a substantially rigid structure.

For supporting the cart or vehicle on the ground in load carrying position as shown by full lines in Fig. 1, a ground engaging bracket indicated, as a whole, by the numeral 24 is provided and so positioned with respect to the receptacle of the vehicle or cart that the forward end portion 25 of the bracket terminates closely adjacent and substantially in engagement with the axle 18 and is secured to the load supporting member 12 by means of bolts 26, thereby providing a structure whereby any forward thrust exerted on the bracket will be resisted by the axle and thereby relieve the strain on the bolt 26 and load supporting member 12, which is intended to be formed of relatively thin sheet-like material.

The opposite, rear or upper end portion 27 of the bracket 24 terminates adjacent and substantially in engagement with the bead 22 formed on the upper edge of the rear end wall of the receptacle and is secured to the receptacle by means of bolts 28, thereby providing a structure whereby a downward thrust on the bracket 24 is resisted by the bead 22 and strain on the bolts 28 is relieved.

For handling and manipulating the cart, a V-shaped handle indicated, as a whole, by the numeral 29 is formed preferably of channel iron having a U-shaped cross section and provided with a leg portions 31 adapted to straddle the receptacle 11 adjacent the outer sides thereof and having their end portions 32 positioned closely adjacent and in substantial contact with the lower sides of the beads 22 formed on the upper edge portions of the side walls 15, as clearly illustrated in Figs. 1 and 4, the end portions 32 of the handle being adapted to be secured to the side walls 15 of the receptacle by means of bolts 33 extending through the side wall and through elongated plates 34 positioned adjacent the inner faces of the side walls 15, thereby providing a strong rigid connection between the handle 29 and the receptacle 11. For further convenient handling of the cart, the handle 29 is provided with a hand grip 35, as clearly illustrated in Figs. 1 and 2, and adapted to be secured thereto by means of bolts 36.

It will be noted by reference to the dotted line position shown in Fig. 1 that when the cart is in loading position, the forward edge portion of the receptacle is positioned adjacent the ground, and that by exerting a force by the operator's foot against the ground engaging bracket 24 and in a forwardly direction of the vehicle, the front edge portion may be forced into a pile of sand, gravel or the like, thereby facilitating the loading of the receptacle, and that by reason of the center of gravity of the cart being positioned forwardly of the axle 18, when the cart is in the dotted line position shown in Fig. 1, the receptacle will be maintained in such position while such material as leaves or the like may be raked or pushed into the receptacle.

Furthermore, it will be noted by reference to the dotted line position illustrated in Fig. 1 that the handle 29 is also positioned forwardly of a vertical plane, indicated by the line (A) extending through the center of the axle 18, and that by reason of such an arrangement, the cart may be manipulated to move it bodily in a rearward direction to facilitate the spreading or distribution of the material as it is discharged from the receptacle.

It will be observed from the foregoing description that the present invention provides a most convenient and desirable cart or vehicle of a type suitable for use around one's home, lawn, garden, or the like, and which may be readily and conveniently loaded and dumped as desired, and wherein novel means are provided for the spreading or distribution of material as it is discharged from the receptacle.

Furthermore, it will be noted that the present invention provides a novel construction and arrangement, which contribute materially to the sturdiness and durability of the vehicle, and to its efficiency and economy in construction.

Obviously, the present invention is not limited to the precise construction and arrangement shown and described as the same may be variously modified without departing from the spirit and scope of the invention as set forth in the appended claims.

What I claim as new and desire to secure by Letters Patent is:

1. A cart having a receptacle comprising a load supporting member provided with a substantially flat normally inclined portion adjacent its front end and with an integrally formed curved portion adjacent its rear end, substantially flat vertically disposed side walls secured to said load supporting member, said flat and curved portions of the supporting member and said side walls having hollow beads adjacent their upper edge portions, a continuous reinforcing rod extending through said beads, an axle secured to said supporting member, wheels on said axle, a handle having leg portions secured to the respective side walls closely adjacent the beads formed thereon, and a ground engaging bracket having an end portion terminating in engagement with said axle and secured to said receptacle, said bracket having its opposite end portion terminating in engagement with the bead formed on the curved portion of the load supporting member and secured to said curved portion of the member.

2. A cart having a receptacle comprising a load supporting member provided with a substantially flat normally inclined portion formed integrally therewith adjacent its front end and with an integrally formed curved portion adjacent its rear end, substantially flat vertically disposed side walls having flanged portions adjacent their respective lower edges secured to said load supporting member, said flat and curved portions of the supporting member and said side walls having outwardly extending hollow beads adjacent their upper edge portions, a continuous reinforcing rod extending through said beads, a pair of elongated plates adjacent the inner faces of said side walls, an axle secured to said supporting member and flanges, wheels on said axle, a V-shaped handle of U-shaped cross-section having leg portions secured to said plates and to the respective side walls at the outer sides thereof and closely adjacent the beads formed thereon, and a ground engaging bracket having an end portion terminating closely adjacent said axle and secured to said receptacle, said bracket having its opposite end portion terminating closely adjacent the bead formed on the curved portion of the load supporting member and secured to said curved portion of the member.

EDWIN L. MASTERS.